(12) United States Patent
Kato

(10) Patent No.: US 9,033,820 B2
(45) Date of Patent: May 19, 2015

(54) GOLF CLUB HEAD

(71) Applicant: DUNLOP SPORTS CO. LTD., Kobe-shi, Hyogo (JP)

(72) Inventor: Akira Kato, Kobe (JP)

(73) Assignee: DUNLOP SPORTS CO., LTD., Kobe (JP)

( * ) Notice: Subject to any disclaimer, the term of this patent is extended or adjusted under 35 U.S.C. 154(b) by 115 days.

(21) Appl. No.: 13/770,134

(22) Filed: Feb. 19, 2013

(65) Prior Publication Data

US 2013/0225319 A1    Aug. 29, 2013

(30) Foreign Application Priority Data

Feb. 29, 2012  (JP) ................. 2012-043126

(51) Int. Cl.
    *A63B 53/04* (2006.01)
    *B23K 26/00* (2014.01)
    *B23K 26/36* (2014.01)
    *B23K 26/40* (2014.01)

(52) U.S. Cl.
    CPC ............. *A63B 53/04* (2013.01); *B23K 26/0087* (2013.01); *A63B 2053/0445* (2013.01); *A63B 53/047* (2013.01); *A63B 2053/0408* (2013.01); *B23K 26/367* (2013.01); *B23K 26/4005* (2013.01); *B23K 26/4015* (2013.01); *B23K 26/4065* (2013.01); *B23K 26/4085* (2013.01); *A63B 53/0466* (2013.01); *A63B 53/0487* (2013.01)

(58) Field of Classification Search
    CPC ........... B23K 26/4005; B23K 26/4015; B23K 26/4065; B23K 26/4085; B23K 26/367; A63B 2053/0445; A63B 2053/0408; A63B 53/0487; A63B 53/0466

See application file for complete search history.

(56) References Cited

U.S. PATENT DOCUMENTS

| | | | |
|---|---|---|---|
| 8,172,699 B2 * | 5/2012 | Nakamura | 473/330 |
| 2008/0125242 A1 | 5/2008 | Ban | |
| 2009/0305812 A1 | 12/2009 | Nakamura | |
| 2009/0312116 A1 | 12/2009 | Ban | |
| 2010/0087270 A1 | 4/2010 | Ban et al. | |
| 2010/0113180 A1 * | 5/2010 | Nakamura | 473/331 |
| 2010/0261545 A1 | 10/2010 | Ban | |
| 2010/0317459 A1 | 12/2010 | Ban | |
| 2011/0269567 A1 | 11/2011 | Ban et al. | |
| 2011/0269568 A1 * | 11/2011 | Ban | 473/331 |
| 2011/0300967 A1 | 12/2011 | Ban | |

FOREIGN PATENT DOCUMENTS

| | | |
|---|---|---|
| JP | 9-253250 A | 9/1997 |
| JP | 2002-153575 A | 5/2002 |
| JP | 2007-202633 A | 8/2007 |
| JP | 2011-251016 A | 12/2011 |

\* cited by examiner

*Primary Examiner* — Stephen Blau
(74) *Attorney, Agent, or Firm* — Birch, Stewart, Kolasch & Birch, LLP

(57) ABSTRACT

A golf club head of the present invention includes a face. The face has a score line groove, a fine groove, and a land area. A depth of the fine groove is 0.01 mm or greater and less than 0.03 mm. A width of the fine groove is 0.1 mm or greater and 0.3 mm or less. A pitch of the fine groove is 0.3 mm or greater and 0.7 mm or less. Preferably, the face further has a protruding part protruding beyond the land area. Preferably, the protruding part is provided on a top blade side of the fine groove. Preferably, the protruding part extends along the fine groove.

12 Claims, 6 Drawing Sheets

GOLF CLUB HEAD

The present application claims priority on Patent Application No. 2012-043126 filed in JAPAN on Feb. 29, 2012, the entire contents of which are hereby incorporated by reference.

BACKGROUND OF THE INVENTION

1. Field of the Invention

The present invention relates to a golf club head having a score line groove.

2. Description of the Related Art

A score line groove is formed on many golf club heads. The score line groove can contribute to an increase in a backspin rate.

Japanese Patent Application Laid-Open No. 9-253250 discloses a head having a small groove formed on a face surface. The small groove is formed by utilizing a cutting trace when the face surface is formed.

Japanese Patent Application Laid-Open No. 2002-153575 discloses a concave part formed on a face surface by micro fabrication. The depth of the concave part is 5 to 10 μm, and the width thereof is 5 to 20 μm.

Japanese Patent Application Laid-Open No. 2007-202633 discloses a head having a small groove formed on a face part. The small groove has an opening width and a depth smaller than those of a score line.

Japanese Patent Application Laid-Open No. 2008-132168 (US2008/0125242, US2009/0312116, US2010/0261545) discloses a head including a plurality of score line grooves and a plurality of narrow grooves. An angle between the narrow groove and the score line groove is set to 40 degrees or greater and 70 degrees or less, clockwise as viewed from the toe side of the score line groove.

Japanese Patent Application Laid-Open No. 2010-88678 (US2010/0087270) discloses a head including a plurality of narrow grooves extending from a toe side to a heel side.

Japanese Patent Application Laid-Open No. 2011-234748 (US2011/0269568) discloses a head having a narrow groove formed in parallel with adjacent score lines in each region between the score lines.

Japanese Patent Application Laid-Open No. 2011-234749 (US2011/0269567) discloses a head having a plurality of score lines, first narrow grooves, and second narrow grooves formed on a face surface. The first narrow grooves are parallel to the score lines. The second narrow grooves cross the score lines.

SUMMARY OF THE INVENTION

In golf in rainy weather, a face impacts a ball in a state where water exists between the face and the ball. The water may reduce friction between the face and the ball. The reduction in the friction may cause reduction in the backspin rate. In a shot from a rough, the face impacts the ball in a state where grass (lawn) exists between the face and the ball. The grass may reduce the friction between the face and the ball. The reduction in the friction may cause the reduction in the backspin rate. The backspin rate may vary depending on a variety of conditions.

It is an object of the present invention to provide a golf club which can obtain good backspin.

A golf club head according to the present invention includes a face. The face has a score line groove, a fine groove, and a land area. Preferably, a depth of the fine groove is 0.01 mm or greater and less than 0.03 mm. Preferably, a width of the fine groove is 0.1 mm or greater and 0.3 mm or less. Preferably, a pitch of the fine groove is 0.3 mm or greater and 0.7 mm or less.

Preferably, the face further has a protruding part protruding beyond the land area. Preferably, the protruding part is provided on a top blade side of the fine groove. Preferably, the protruding part extends along the fine groove.

Preferably, the fine groove is formed using a laser. Preferably, the protruding part is formed by moving a portion heated by the laser by the operation of gravity.

Preferably, a height of the protruding part is 0.001 mm or greater and 0.02 mm or less.

Preferably, the pitch of the fine groove is 1.5 times or greater and 5 times or less the width of the fine groove.

Preferably, an angle θ between the score line groove and the fine groove is −45 degrees or greater and 45 degrees or less.

DESCRIPTION OF THE PREFERRED EMBODIMENTS

Hereinafter, the present invention will be described in detail based on the preferred embodiments with appropriate references to the accompanying drawings.

Figure 1:
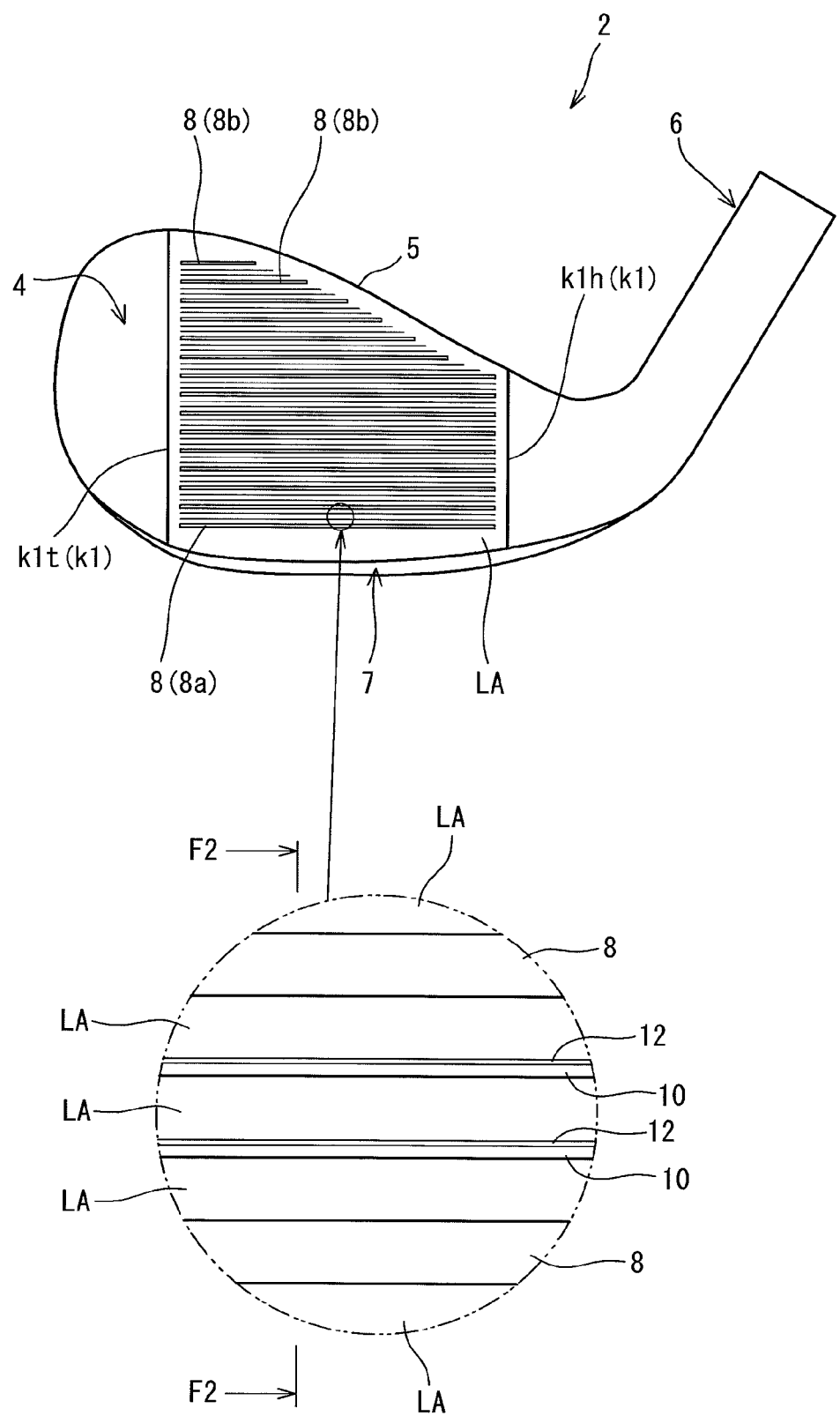
FIG. 1 is a front view of a golf club head according to a first embodiment of the present invention.
Figure 2:
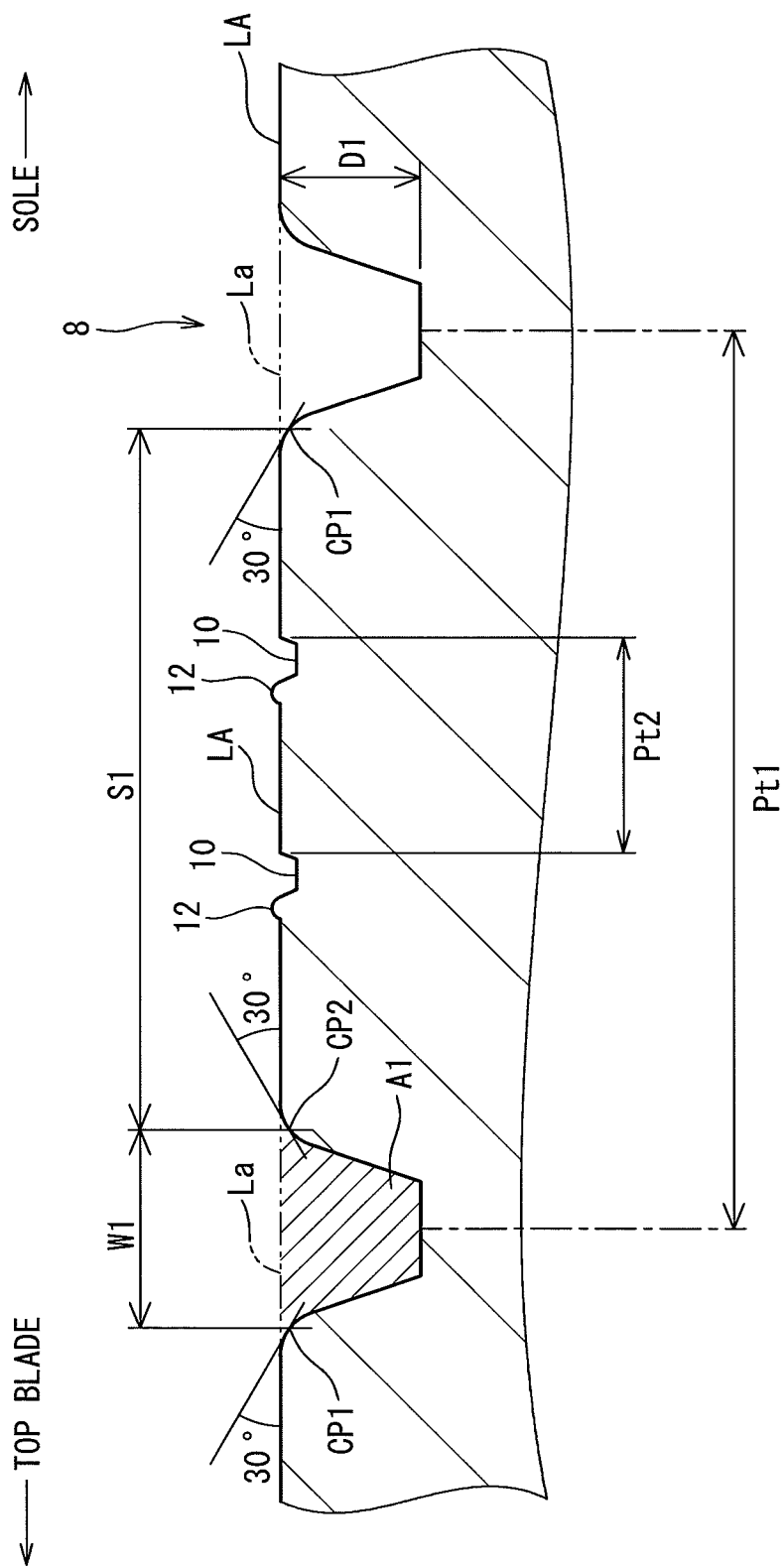
FIG. 2 is a cross-sectional view taken along line F2-F2 of FIG. 1.
Figure 3:
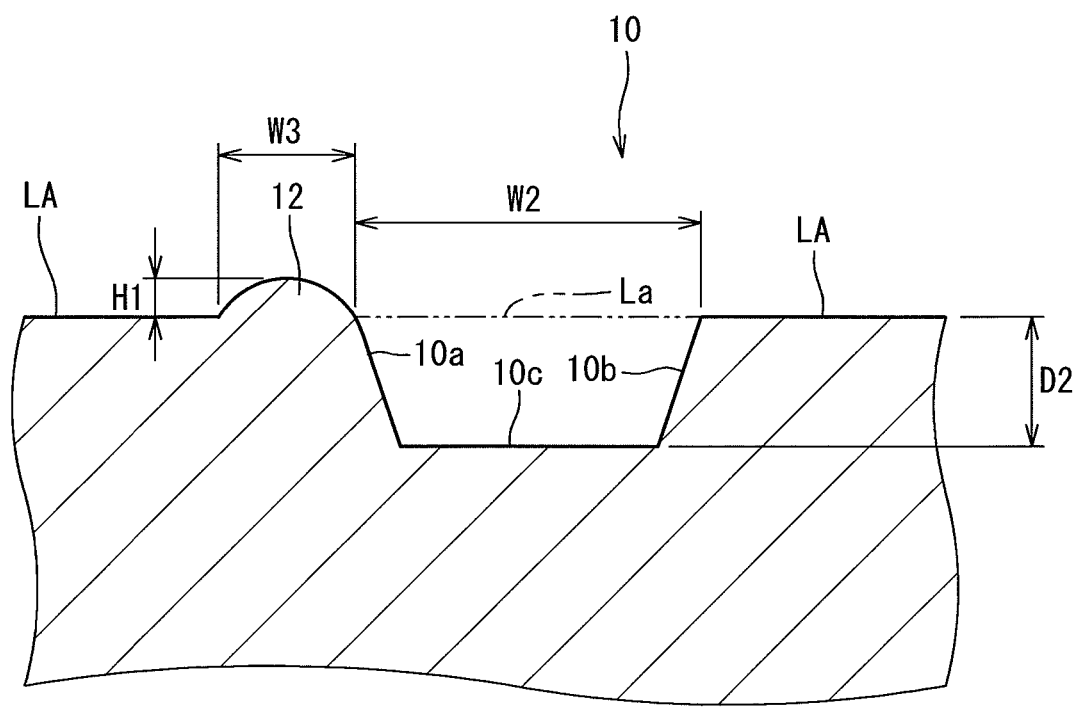
FIG. 3 is an enlarged view of a fine groove in FIG. 2.

In FIG. 1, a head 2 is placed on a level surface at a predetermined lie angle and real loft angle. FIG. 2 is a cross-sectional view taken along line F2-F2 of FIG. 1. FIG. 3 is an enlarged cross-sectional view of a vicinity of a fine groove 10 (to be described later).

A golf club head 2 is a so-called iron type golf club head. The head is also referred to as an iron head. The head is for right-handed players. The golf club head 2 is a so-called wedge. A real loft angle of the wedge is usually 43 degrees or greater and 70 degrees or less.

The head 2 has a face 4, a top blade 5, a hosel 6, and a sole 7. The face 4 has a score line groove 8 formed thereon. The golf club head 2 has a shaft hole (not shown) to which a shaft is mounted. The shaft hole is formed in the hosel 6.

The materials of the head 2 and the face 4 are not restricted. The face 4 may be a metal, or may be a nonmetal. Examples of the metal include iron, stainless steel, maraging steel, pure titanium, and a titanium alloy. Examples of the iron include soft iron (low-carbon steel having a carbon content of less than 0.3 wt %). Examples of the nonmetal include CFRP (carbon fiber reinforced plastic).

The head 2 has the plurality of score line grooves 8. The score line grooves 8 have longest lines 8a having a longest length and non-longest lines 8b shorter than the longest lines 8a. The length of the non-longest line 8b closer to a top blade side becomes shorter.

The toe side ends of the longest lines 8a are substantially located on one straight line. The heel side ends of the longest lines 8a are substantially located on one straight line.

The face 4 has a land area LA. The land area LA indicates a plane portion of a surface of the face 4 (face surface) on which the grooves are not formed. If minute unevenness formed by a shot blasting treatment (to be described later) or the like is disregarded, the land area LA is substantially a plane. Therefore, in the embodiment, the land area LA is assumed to be a plane.

A part of the face 4 is subjected to a treatment for adjusting a surface roughness. The typical example of the treatment is the shot blasting treatment. A boundary line k1 between an area which is subjected to the shot blasting treatment and an area which is not subjected to the shot blasting treatment is shown in FIG. 1. An area between a toe side boundary line k1t and a heel side boundary line k1h is subjected to the shot blasting treatment. As shown in FIG. 1, the boundary line k1t and the boundary line k1h are substantially parallel to each other. All the score line grooves 8 are formed in the area which is subjected to the shot blasting treatment. An area located on a toe side of the toe side boundary line k1t is not subjected to the shot blasting treatment. An area located on a heel side of the heel side boundary line k1h is not subjected to the shot blasting treatment. The toe side boundary line k1t and the heel side boundary line k1h are visually recognized by the absence or presence of the shot blasting treatment. The surface roughness is increased by the shot blasting treatment. The increased surface roughness can increase the backspin rate of a ball. The increase in the backspin rate tends to stop the ball near the point of fall. The increase in the backspin rate can facilitate the stopping of the ball at the aiming point. The increase in the backspin rate is particularly useful for a shot targeting a green and an approach shot.

The face surface may be polished before the score line grooves 8 are formed. The face surface of a head before the score line grooves 8 are formed can be smoothed by polishing the face surface.

A treatment (the shot blasting treatment or the like) for adjusting a surface roughness may be carried out before the score line grooves 8 are formed. The treatment for adjusting the surface roughness may be carried out after the score line grooves 8 are formed.

The face 4 has the fine groove 10 (see an enlarged part of FIG. 1, and FIGS. 2 and 3). In the application, the fine groove 10 is a separate groove from the score line groove 8. The width W2 of the fine groove 10 is narrower than the width W1 of the score line groove 8. The fine groove 10 is disposed between the adjacent score line grooves 8. In the embodiment, the two fine grooves 10 are formed between the adjacent score line grooves 8. In the embodiment, the fine grooves 10 are parallel to the score line grooves 8. All the fine grooves 10 are parallel to each other.

As shown in FIG. 3, the fine groove 10 has a side surface 10a located on the top blade side, a side surface 10b located on a sole side, and a bottom surface 10c. The bottom surface 10c is a plane parallel to the land area LA. The bottom surface 10c may not exist. When the fine groove 10 is formed by a method to be described later, possibly, the cross-sectional shape of the fine groove 10 is not made symmetrical as shown in FIG. 3. Possibly, the side surfaces 10a and 10b and the bottom surface 10c are not planes. Possibly, the cross-sectional shape of a protruding part 12 is not a circular arc shape having a constant curvature radius.

The face 4 has the protruding part 12 (see the enlarged part of FIG. 1, and FIGS. 2 and 3). The protruding part 12 is in a bar form. The protruding part 12 extends along a straight line. The protruding part 12 is parallel to the fine groove 10. The protruding part 12 extends along the fine groove 10. The protruding part 12 protrudes beyond the land area LA.

The protruding part 12 is adjacent to the fine groove 10. The land area LA does not exist between the protruding part 12 and the fine groove 10. The side surface 10a of the fine groove 10 and the outer surface of the protruding part 12 are continuous.

The protruding part 12 is provided on the top blade 5 side of the fine groove 10. The protruding part 12 is provided only on the top blade 5 side of the fine groove 10. The protruding part 12 is not provided on the sole 7 side of the fine groove 10. The protruding part 12 may not exist.

The backspin rate can be increased by forming the fine groove 10 in addition to the score line groove 8. Furthermore, the backspin rate can be increased by providing the protruding part 12.

The protruding part 12 is adjacent to the fine groove 10. Therefore, the protruding part 12 has the same effect as that of the increased depth D2 of the fine groove 10. The backspin rate can be increased by a synergistic effect of the fine groove 10 with the protruding part 12.

The protruding part 12 is provided only on the top blade 5 side of the fine groove 10. This can contribute to the increase in the backspin rate. During impact, the ball is moved on the face 4. The movement is caused by the sliding and/or rolling of the ball. The movement is produced by the inclination of the face 4, that is, the loft angle. The direction of the movement is a direction from the sole surface 7 side to the top blade 5 side. The protruding part 12 is not provided on the sole surface 7 side of the fine groove 10, and whereby the ball moving on the face 4 tends to enter into the fine groove 10. The entering tends to increase the backspin rate. Furthermore, a physical engagement effect is enhanced by the protruding part 12 provided on the top blade 5 side of the fine groove 10. Therefore, the backspin rate can be increased.

[Method for Forming Score Line Groove]

A method for forming the score line groove 8 is not restricted. Examples of the method for forming the score line groove 8 include forging, press processing, casting, and cutting processing (carving).

In the cutting processing, the cutting processing of the score line groove 8 is carried out using a cutter. In the press processing, a score line groove metal mold which has a protruding part corresponding to the shape of the score line groove 8 is used. The score line groove metal mold is forced on the face, and the score line groove 8 is formed. The score line groove metal mold in the press processing may be referred to as a "score line groove engraved mark" by a person skilled in the art.

In respect of the accuracy of the cross-sectional shape of the score line groove 8, the cut processing is preferable.

In the case of the cut processing, the edge of the score line groove 8 is apt to be sharp. The edge is apt to damage the ball. In this respect, processing for rounding the edge may be carried out after the cut processing. Examples of the processing for rounding the edge include buff and shot blasting. The buff is carried out, for example, by a wire brush. When processing for rounding the edge is carried out after the cut processing, the variation in the cross-sectional shape of the score line groove is apt to occur. In respect of the accuracy of the cross-sectional shape, the edge is preferably rounded by the cut processing.

Preferably, an NC processing machine is used for the cut processing of the score line groove 8. NC means numerical control. The score line groove 8 is formed by an axially rotated cutter. While the cutter is axially rotated, the cutter is moved. The cutter is moved based on a program memorized in the NC processing machine. The score line groove 8 having a designed depth is formed at a designed position.

A score line groove width is shown by a double-pointed arrow W1 in FIG. 2. A distance between the score line grooves 8 is shown by a double-pointed arrow S1 in FIG. 2. In FIG. 2, an area of a transverse plane of the score line groove 8 is shown by A1. The area A1 is an area of an area shown by hatching.

The groove width W1 and the groove distance S1 are measured based on the golf rules defined by R&A (Royal and Ancient Golf Club of Saint Andrews). The measuring method is referred to as "30 degree method of measurement". The 30 degree method of measurement determines contact points CP1 and CP2 of a tangent having an angle of 30 degrees with respect to the land area LA and a groove. A distance between the contact point CP1 and the contact point CP2 is defined as the groove width W1 (see FIG. 2).

The groove depth D1 is a distance between an extended line La of the land area LA and a lowest point of a groove section line (see FIG. 2). The groove area A1 is an area of a portion surrounded by the extended line La and the profile (section line) of the groove.

In respect of spin performance, the groove width W1 is preferably equal to or greater than 0.20 (mm), more preferably equal to or greater than 0.25 (mm), and still more preferably equal to or greater than 0.30 (mm). In respects of the golf rules and of suppressing reduction in a flight distance caused by an excessively large spin amount, the groove width W1 is preferably equal to or less than 0.889 (mm), more preferably equal to or less than 0.85 (mm), and still more preferably equal to or less than 0.80 (mm).

The groove distance S1 is preferably set in consideration of the conformity to the golf rules. In respect of the conformity to the rules, a value obtained by dividing the area A1 by a groove pitch (groove width W1+distance S1) is preferably equal to or less than 0.003 square inches/inch (0.0762 mm$^2$/mm). In respect of the conformity to the rules, the groove distance S1 is preferably equal to or greater than 3 times the groove width W1. In respect of the rule conformity, a pitch Pt1 of the score line groove 8 is preferably 2.0 mm or greater, and a pitch Pt1 of the score line groove 8 is preferably 4.0 mm or less.

[Method for Forming Fine Groove and Protruding Part]

The fine groove 10 may be formed by the same method as that of the score line groove 8. For example, the cutting processing of the fine groove 10 may be carried out by the NC processing machine (CNC processing machine).

More preferably, the fine groove 10 is formed by a laser. The laser is suitable for heating a narrow region. A small groove having the width W2 (see FIG. 3) can be formed with sufficient accuracy by laser processing. The width W2 is determined based on an intersecting point between the extended line La of the land area LA and the surface of the face (see FIG. 3).

Figure 4:
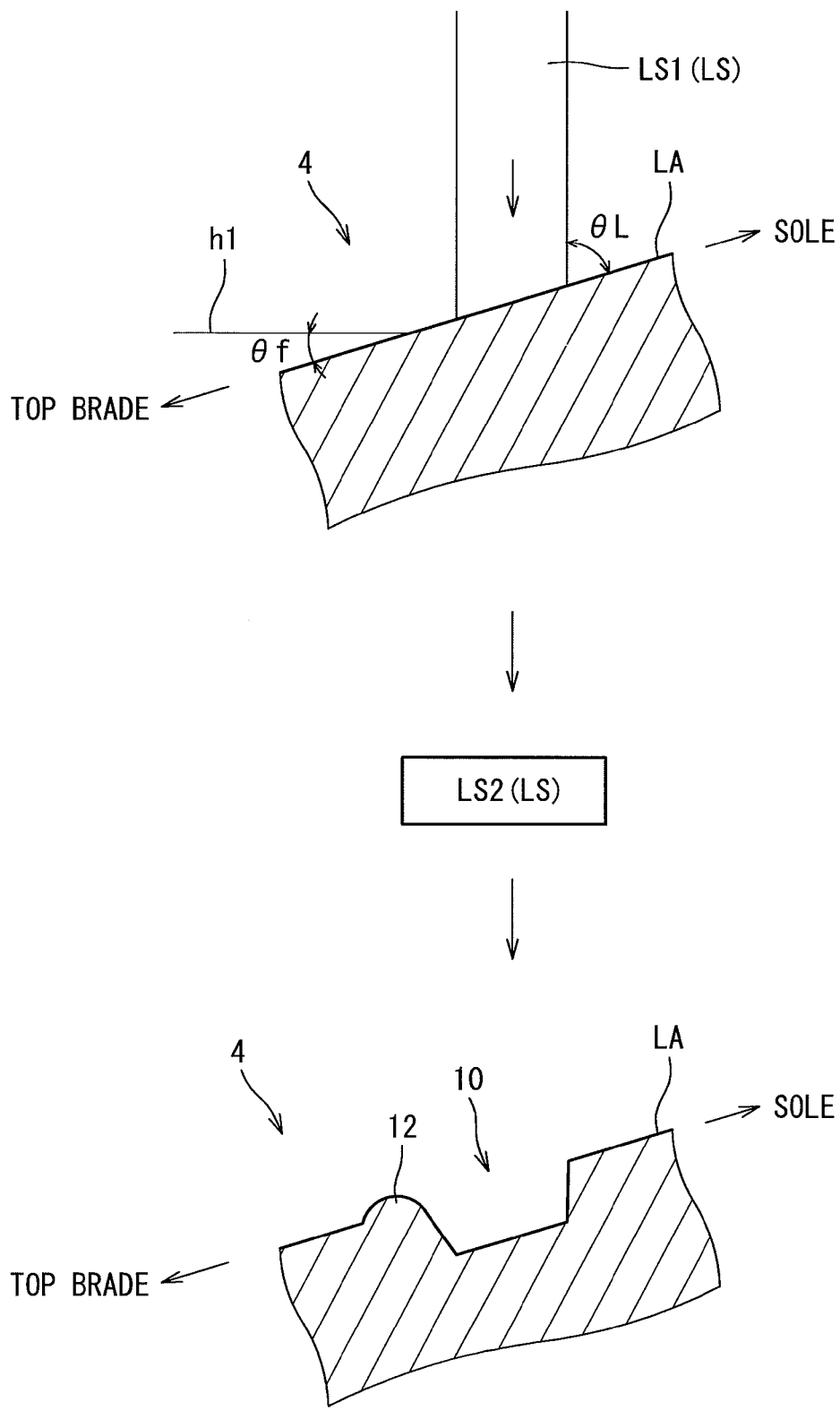
FIG. 4 describes a method for forming the fine groove and a protruding part.

FIG. 4 describes a preferable method for forming the protruding part 12. The formation method irradiates the face surface with a laser LS. The face surface (land area LA) is irradiated with the laser LS in a state where the face surface is inclined with respect to a level surface h1. The specification of the formed protruding part 12 can be adjusted by the direction of the inclination and an inclination angle θf. The inclination angle of is an angle of the face surface (land area LA) with respect to the level surface h1 (see FIG. 4).

In the embodiment, the face 4 is irradiated with the laser LS in a state where the face 4 is inclined so that the sole surface 7 side of the face 4 is located above the top blade 5 side. A portion heated by the laser LS reaches a high temperature. The portion reaching a high temperature can be dissolved. The dissolved portion can flow. The flow is caused by gravity. The fine groove 10 is formed by the flow. Furthermore, a fluid is moved to the position of the protruding part 12 by the flow. The portion in which the protruding part 12 is formed is not irradiated with the laser LS. Therefore, the temperature of the moved fluid is lowered to solidify the fluid. The protruding part 12 is formed by the solidification. Thus, the protruding part 12 is formed by moving the portion heated by the laser LS by the operation of the gravity. Since the method uses the laser LS, the method enables heating with high positional accuracy. The fine groove 10 and the protruding part 12 can be formed with sufficient accuracy by adjusting output of the laser, a movement speed of the laser, the inclination angle θf, and a laser irradiation angle θL or the like. The laser irradiation angle θL is an angle of the laser LS with respect to the face surface (land area LA) (see FIG. 4).

In respect of facilitating the formation of the fine groove 10 and the protruding part 12, the inclination angle θf is preferably equal to or greater than 5 degrees, more preferably equal to or greater than 10 degrees, and still more preferably equal to or greater than 15 degrees. When the inclination angle θf is excessively large, the movement speed of the fluid is excessively large, which may reduce the formation accuracy of the protruding part 12. In this respect, the inclination angle θf is preferably equal to or less than 45 degrees, more preferably equal to or less than 40 degrees, and still more preferably equal to or less than 30 degrees. However, the inclination angle θf can be suitably adjusted in consideration of the material of the face surface and the output of the laser LS or the like.

When the inclination angle θf is set minus, the protruding part 12 can be formed only on the sole surface 7 side of the fine groove 10. In a state where the inclination angle θf is set minus, the sole surface 7 side (leading edge) is located below the top blade 5.

There can be also employed a method for forming the fine groove 10 and the protruding part 12 including the steps of irradiating the face surface with the laser LS in a state where the inclination angle θf is set plus, and irradiating the face surface with the laser LS in a state where the inclination angle θf is set minus. In this case, the protruding parts 12 are formed on both sides of the fine groove 10. That is, the protruding parts 12 are formed on the top blade 5 side of the fine groove 10 and on the sole surface 7 side of the fine groove 10.

In respect of energy efficiency, the laser irradiation angle θL is preferably closer to 90 degrees. In respect of preventing the protruding part 12 from being irradiated with the laser LS, the laser irradiation angle θL may be less than 90 degrees. In these respects, the angle θL is preferably 45 degrees or greater and 90 degrees or less, more preferably 50 degrees or greater and 90 degrees or less, and still more preferably 60 degrees or greater and 90 degrees or less. The angle θL is an angle between the laser LS and the land area LA which is on the sole surface 7 side of the irradiation position of the laser LS. Therefore, the protruding part 12 is hardly irradiated with the laser LS by setting the angle θL to be equal to or less than 90 degrees.

In respect of facilitating the formation of the fine groove 10 and/or the protruding part 12 by the laser LS, the material of the portion in which the fine groove 10 and the protruding part 12 are provided is preferably a metal. More preferred examples of the material include soft iron (low-carbon steel having a carbon content of less than 0.3 wt %), stainless steel, a titanium alloy, and pure titanium.

In a more preferred embodiment, two or more kinds of lasers LS are used. In the embodiment of FIG. 4, a first laser LS1 and a second laser LS2 are used. After the face surface is irradiated with the first laser LS1 in the embodiment, the face surface is irradiated with the second laser LS2. An irradiation speed of the first laser LS1 is slower than that of the second laser LS2. A current of the first laser LS1 is greater than that of the second laser LS2. A frequency of the first laser LS1 is higher than that of the second laser LS2. A heating temperature by the first laser LS1 is higher than that by the second laser LS2.

The method for forming the fine groove 10 and the protruding part 12 according to the embodiment of FIG. 4 includes a first step of forming an initial fine groove (not illustrated) using gravity by the first laser LS1, and a second step of adjusting a depth D2, surface roughness, shape, and/or color of the initial fine groove by the second laser LS2 to form the fine groove 10. The fine groove 10 having excellent dimension accuracy can be formed by using the two or more kinds of lasers LS.

[Depth D2 of Fine Groove]

In respect of the increase in the backspin rate, the depth D2 of the fine groove 10 is preferably equal to or greater than 0.01 mm, more preferably equal to or greater than 0.015 mm, and still more preferably equal to or greater than 0.02 mm. When the depth D2 is excessively large, the variation in the backspin rate may occur. In this respect, the depth D2 is preferably less than 0.03 mm, and more preferably equal to or less than 0.025 mm.

[Width W2 of Fine Groove]

In respect of the increase in the backspin rate, the width W2 of the fine groove 10 is preferably equal to or greater than 0.1 mm, more preferably equal to or greater than 0.15 mm, and still more preferably equal to or greater than 0.2 mm. When the width W2 is excessively large, an area for forming the fine groove 10 is decreased. Accordingly, the number of the fine grooves 10 may be decreased. In this respect, the width W2 is preferably equal to or less than 0.3 mm, and more preferably equal to or less than 0.25 mm.

[Pitch Pt2 of Fine Groove]

A pitch of the fine groove 10 is shown by a double-pointed arrow Pt2 in FIG. 2. When the pitch Pt2 is excessively small, the engagement effect of the fine groove 10 may be decreased. In this respect, the pitch Pt2 is preferably equal to or greater than 1.5 times the width W2, and more preferably equal to or greater than 2 times the width W2. When the number of the fine grooves 10 is excessively small, the backspin rate may be decreased. In this respect, the pitch Pt2 is preferably equal to or less than 5 times the width W2, and more preferably equal to or less than 4 times the width W2.

When the pitch Pt2 of the fine groove 10 is excessively small, the engagement effect of the fine groove 10 may be decreased. In this respect, the pitch Pt2 is preferably equal to or greater than 0.3 mm, and more preferably equal to or greater than 0.4 mm. When the number of the fine grooves 10 is excessively small, the backspin rate may be decreased. In this respect, the pitch Pt2 is preferably equal to or less than 0.7 mm, and more preferably equal to or less than 0.6 mm.

[Height H1 of Protruding Part]

A height of the protruding part 12 is shown by a double-pointed arrow H1 in FIG. 3. The height H1 is a height from the land area LA. The height H1 is measured along a normal line direction of the land area LA. In respect of the increase in the backspin rate, the height H1 of the protruding part 12 is preferably equal to or greater than 0.001 mm, more preferably equal to or greater than 0.003 mm, and still more preferably equal to or greater than 0.005 mm. In respect of the rules for the surface roughness, the height H1 is preferably equal to or less than 0.02 mm, more preferably equal to or less than 0.015 mm, and still more preferably equal to or less than 0.01 mm.

Figure 5:
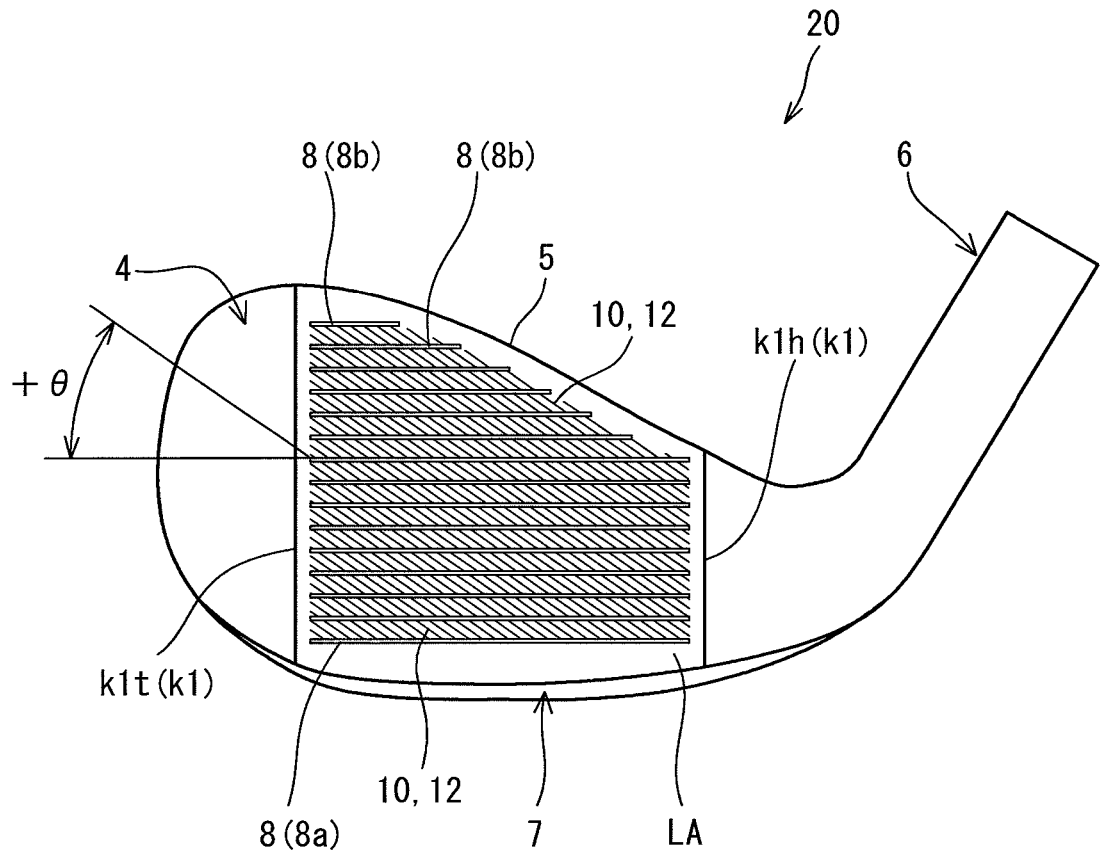
FIG. 5 is a front view of a golf club head according to a second embodiment of the present invention.
Figure 6:
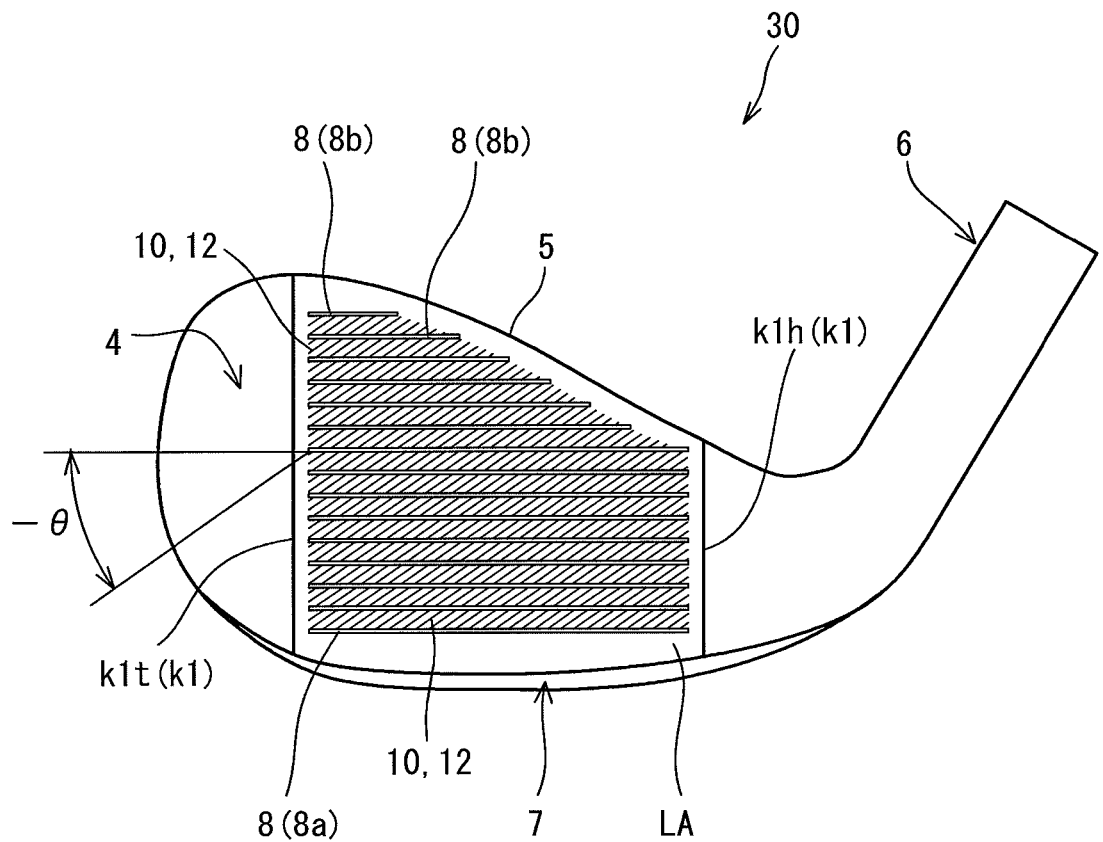
FIG. 6 is a front view of a golf club head according to a third embodiment of the present invention.

FIG. 5 is a front view of a head 20 according to a second embodiment. FIG. 6 is a front view of a head 30 according to a third embodiment.

An angle between the score line groove 8 and the fine groove 10 is shown by a double-pointed arrow +θ in the head 20 of FIG. 5. When the fine groove 10 is inclined so that the toe side of the fine groove 10 is located on the top blade 5 side, the angle θ is set to a plus value.

An angle between the score line groove 8 and the fine groove 10 is shown by a double-pointed arrow −θ in the head 30 of FIG. 6. When the fine groove 10 is inclined so that the toe side of the fine groove 10 is located on the sole surface 7 side, the angle θ is set to a minus value.

The head 20 is the same as the head 2 of the first embodiment except for the extending directions of the fine groove 10 and the protruding part 12. The head 30 is the same as the head 2 of the first embodiment except for the extending directions of the fine groove 10 and the protruding part 12.

The angle θ is an angle as viewed from the front of the face surface (land area LA). That is, the angle θ is determined in a plane including the land area LA.

In the head 2 (FIG. 1), the angle θ is 0 degree. On the other hand, in the head 20 and the head 30, the angle θ is not 0 degree. That is, the score line groove 8 and the fine groove 10 are not parallel to each other. The score line groove 8 and the protruding part 12 are not parallel to each other. In the present invention, a constitution in which the angle θ is not 0 degree can also be employed. For example, when the angle θ is minus as shown in FIG. 6, the backspin rate tends to be increased in a shot in which the face is open.

In respect of the increase in the backspin rate, the angle θ is preferably equal to or greater than −45 degrees, and more preferably equal to or greater than −30 degrees. In respect of the increase in the backspin rate, the angle θ is preferably equal to or less than +45 degrees, and more preferably equal to or less than +30 degrees.

In respect of the golf rules, the depth D1 (mm) of the score line groove is preferably set to be equal to or less than 0.508 (mm), more preferably equal to or less than 0.480 (mm), and still more preferably equal to or less than 0.460 (mm). When the groove depth D1 is excessively small, the area A1 of the transverse plane of the groove is reduced, which may reduce the spin performance. In this respect, the groove depth D1 is preferably equal to or greater than 0.100 (mm), more preferably equal to or greater than 0.200 (mm), and still more preferably equal to or greater than 0.250 (mm).

EXAMPLES

Hereinafter, the effects of the present invention will be clarified by examples. However, the present invention should not be interpreted in a limited way based on the description of the examples.

Example 1

A head (before forming a score line groove) of "Cleveland CG16 Forged Wedge" (trade name) manufactured by Dunlop Sports Co., Ltd. was prepared. The score line groove was formed on the head using a CNC processing machine. Next, a fine groove and a protruding part were formed by a laser beam machine. The kind of a laser was a YAG laser. The real loft angle of the head was set to 58 degrees. A grip and a shaft were mounted to the head to obtain a test club.

Two kinds of lasers were used in laser processing. After a face surface was irradiated with a first laser, the face surface was irradiated with a second laser. The formation of the protruding part was achieved by the first laser. The color and depth D2 of the fine groove were adjusted by the second laser. The specifications of the lasers were as follows.

[First Laser]
  Irradiation Speed (mm/sec): 300
  Current (A): 20
  Frequency (kHz): 10
[Second Laser]
  Irradiation Speed (mm/sec): 500
  Current (A): 15
  Frequency (kHz): 5

The irradiation speed is a movement speed of a position irradiated with the laser. The slower the irradiation speed is, the larger irradiation energy per unit area is, and the higher the temperature become. In this example, the irradiation speed of the first laser was set to be slower than that of the second laser.

During the irradiation of the first laser, the inclination angle θf the face surface was set to 15 degrees.

A head of example 1 was obtained as described above. The specification and evaluation result of the head are shown in the following Table 1. "INFINITE FOCUS optical 3D Measurement Device G4F" (trade name) manufactured by Alicona Imaging GmbH was used for shape measurement for the fine groove and the protruding part.

Examples 2 to 9 and Comparative Examples 1 to 6

Heads and clubs of examples 2 to 9 and comparative examples 1 to 6 were obtained in the same manner as in the example 1 except for adjusting the specification of the laser and/or the inclination angle θf. In the example 8, the inclination angle θf was set minus. The example 9 was prepared by a manufacturing method including a laser processing step in which the inclination angle θf was set plus, and a laser processing step in which the inclination angle θf was set minus. The specifications and evaluation results thereof are shown in the following Tables 1-3.

[Evaluation Method of Backspin Rate]
Ten golf players having a handicap of 0 to 9 made evaluations as testers. "SRIXON Z-STAR" (trade name) manufactured by Dunlop Sports Co., Ltd. was used as a ball. A ball hitting point and a target point were predetermined, and hit balls placed on a semi-rough with a half shot. A distance between the ball hitting point and a cup located at the target point was set to 40 yards. A backspin rate immediately after hitting was measured. "TrackMan" (trade name) manufactured by ISG A/S Denmark was used for the measurement. Each of testers hit balls ten times per each of the clubs. The average value of all the data is shown in the following Tables 1-3.

TABLE 1

Specifications and evaluation results of examples

|  | Example 1 | Example 2 | Example 3 | Example 4 | Example 5 |
|---|---|---|---|---|---|
| Fine groove width W2: (mm) | 0.2 | 0.2 | 0.2 | 0.2 | 0.2 |
| Fine groove depth D2: (mm) | 0.02 | 0.02 | 0.01 | 0.025 | 0.02 |
| Height H1 of protruding part: (mm) | 0.005 | 0.01 | 0.01 | 0.005 | 0.005 |
| Fine groove pitch Pt2: (mm) | 0.6 | 0.6 | 0.6 | 0.6 | 0.3 |
| Pt2/W2 | 3.0 | 3.0 | 3.0 | 3.0 | 1.5 |
| Angle θ: (degree) | 0 | 0 | 0 | 0 | 0 |
| Position of protruding part | Only top blade side | Only top blade side | Only top blade side | Only top blade side | Only top blade side |
| Backspin rate: (rpm) | 4730 | 4850 | 4680 | 4810 | 4750 |

TABLE 2

Specifications and evaluation results of examples and comparative examples

|  | Comparative example 1 | Comparative example 2 | Comparative example 3 | Example 6 | Example 7 |
|---|---|---|---|---|---|
| Fine groove width W2: (mm) | 0.05 | 0.32 | 0.2 | 0.2 | 0.2 |
| Fine groove depth D2: (mm) | 0.02 | 0.02 | 0.005 | 0.02 | 0.02 |
| Height H1 of protruding part: (mm) | 0.01 | 0.01 | 0.01 | 0.0005 | 0.025 |
| Fine groove pitch Pt2: (mm) | 0.15 | 0.6 | 0.6 | 0.6 | 0.6 |
| Pt2/W2 | 3.0 | 1.9 | 3.0 | 3.0 | 3.0 |
| Angle θ: (degree) | 0 | 0 | 0 | 0 | 0 |
| Position of protruding part | Only top blade side | Only top blade side | Only top blade side | Only top blade side | Only top blade side |
| Backspin rate: (rpm) | 4230 | 4450 | 4330 | 4600 | 4650 |

TABLE 3

Specifications and evaluation results of examples and comparative examples

|  | Comparative example 4 | Comparative example 5 | Comparative example 6 | Example 8 | Example 9 |
|---|---|---|---|---|---|
| Fine groove width W2: (mm) | 0.2 | 0.2 | 0.2 | 0.2 | 0.2 |
| Fine groove depth D2: (mm) | 0.02 | 0.02 | 0.02 | 0.02 | 0.02 |
| Height H1 of protruding part: (mm) | 0.01 | 0.01 | 0.01 | 0.01 | 0.01 |
| Fine groove pitch Pt2: (mm) | 1.5 | 0.2 | 1.0 | 0.6 | 0.6 |
| Pt2/W2 | 7.5 | 1.0 | 5.0 | 3.0 | 3.0 |
| Angle θ: (degree) | 0 | 0 | 0 | 0 | 0 |
| Position of protruding part | Only top blade side | Only top blade side | Only top blade side | Sole side | Both sides |
| Backspin rate: (rpm) | 4420 | 4430 | 4460 | 4650 | 4600 |

As shown in Tables 1-3, the examples are highly evaluated as compared with the comparative examples. The advantages of the present invention are apparent.

The present invention can be applied to all golf club heads including the score line groove. The present invention can be used for an iron type golf club head, a wood type golf club head, a utility type golf club head, a hybrid type golf club head, and a putter type golf club head or the like.

The description hereinabove is merely for an illustrative example, and various modifications can be made in the scope not to depart from the principles of the present invention.

What is claimed is:

1. A golf club head comprising a face, wherein
    the face has a score line groove, a fine groove, and a land area;
    a depth of the fine groove is 0.01 mm or greater and less than 0.03 mm;
    a width of the fine groove is 0.1 mm or greater and 0.3 mm or less;
    a pitch of the fine groove is 0.3 mm or greater and 0.7 mm or less;
    the face has a protruding part protruding beyond the land area; and
    the pitch of the fine groove is 1.5 times or greater the width of the fine groove and 5 times or less the width of the fine groove.

2. The golf club head according to claim 1, wherein
    the protruding part is provided on a top blade side of the fine groove; and
    the protruding part extends along the fine groove.

3. The golf club head according to claim 2, wherein a height of the protruding part is 0.001 mm or greater and 0.02 mm or less.

4. The golf club head according to claim 2, wherein the protruding part is adjacent to the fine groove.

5. The golf club head according to claim 2, wherein the protruding part is provided only on the top blade side of the fine groove.

6. The golf club head according to claim 5, wherein the golf club head is manufactured by a manufacturing method comprising the steps of:
    making a fluid dissolved by irradiation of the laser flow by gravity while irradiating the face with the laser in a state where the face is inclined so that a sole surface side of the face is located above the top blade side; and
    solidifying the fluid to form the protruding part.

7. The golf club head according to claim 1, wherein the fine groove is formed using a laser; and
    the protruding part is formed by moving a portion heated by the laser by the operation of gravity.

8. The golf club head according to claim 7, wherein the golf club head is manufactured by a manufacturing method comprising the steps of:
    making a fluid dissolved by irradiation of the laser flow by gravity while irradiating the face with the laser in a state where the face is inclined; and
    solidifying the fluid to form the protruding part.

9. The golf club head according to claim 1, wherein an angle θ between the score line groove and the fine groove is −45 degrees or greater and 45 degrees or less.

10. The golf club head according to claim 1, wherein the plurality of score line grooves are formed;
    the plurality of fine grooves are formed;
    all the score line grooves are parallel to each other; and
    all the fine grooves are parallel to the score line grooves.

11. The golf club head according to claim 1, wherein the fine groove is inclined with respect to the score line groove; and
    the fine groove is inclined so that a toe side of the fine groove is located on a top blade side.

12. The golf club head according to claim 1, wherein the fine groove is inclined with respect to the score line groove; and
    the fine groove is inclined so that a toe side of the fine groove is located on a sole side.

* * * * *